United States Patent [19]

Chuang et al.

[11] Patent Number: 5,212,831
[45] Date of Patent: May 18, 1993

[54] METHOD AND APPARATUS FOR AUTONOMOUS ADAPTIVE FREQUENCY ASSIGNMENT IN TDMA PORTABLE RADIO SYSTEMS

[75] Inventors: Justin C. Chuang, Eatontown; Nelson R. Sollenberger, Tinton Falls, both of N.J.

[73] Assignee: Bell Communications Research, Inc., Livingston, N.J.

[21] Appl. No.: 619,059

[22] Filed: Nov. 28, 1990

[51] Int. Cl.$^5$ .................. H04B 7/00; H04B 17/00
[52] U.S. Cl. ........................... 455/54.1; 455/56.1; 455/62; 379/63
[58] Field of Search ............... 455/33.1, 33.2, 33.4, 455/34.1, 34.2, 53.1, 54.1, 56.1, 62, 63, 67.3, 67.6; 379/59, 61, 63

[56] References Cited

U.S. PATENT DOCUMENTS

| | | | |
|---|---|---|---|
| 4,485,486 | 11/1984 | Webb et al. | 455/33 |
| 4,531,235 | 7/1985 | Brusen | 455/273 |
| 4,549,311 | 10/1985 | McLaughlin | 455/277 |
| 4,550,443 | 10/1985 | Freeburg | 455/33 |
| 4,670,906 | 6/1987 | Thro | 455/56 |
| 4,696,027 | 9/1987 | Bonta | 379/60 |
| 4,737,978 | 4/1988 | Burke et al. | 379/60 |
| 4,792,984 | 12/1988 | Matsuo | 455/32 |
| 4,849,991 | 7/1989 | Arnold et al. | 375/84 |
| 4,872,205 | 10/1989 | Smith | 455/58 |
| 4,937,841 | 6/1990 | Chuang et al. | 375/94 |
| 4,941,155 | 7/1990 | Chuang et al. | 375/84 |
| 4,965,850 | 10/1990 | Schloemer | 455/33 |
| 5,038,399 | 8/1991 | Bruckert | 455/62 |
| 5,047,762 | 9/1991 | Bruckert | 455/63 |
| 5,093,927 | 3/1992 | Shanley | 455/62 |

FOREIGN PATENT DOCUMENTS 2208985 4/1989 United Kingdom .................. 455/62

Primary Examiner—Reinhard J. Eisenzopf
Assistant Examiner—Lisa Charouel
Attorney, Agent, or Firm—Leonard Charles Suchyta; Stephen M. Gurey

[57] ABSTRACT

To assign and coordinate radio frequencies at the fixed ports (30, 40, 50, 70) of a frequency-reusing radio communications system (5), most existing methods require pre-engineering or impose high complexity in system controller and port hardware. A simple autonomous procedure performed by each port to determine its own transmitting frequency and corresponding receiving frequency is disclosed. This procedure consists of signal strength measurements and an algorithm which selects the frequency with minimum interference from other ports. In particular, a port turns off (202) its own transmitter (306) and scans (203) all the candidate transmitter frequencies and measures (312) signal powers form the other ports. The frequency channel with the lowest received power is tentatively assigned (204) for downlink transmission by that port. This procedure is repeated by all the ports either independently and asynchronously or with a coordinated schedule. This cycle is repeated for either a predetermined number of iterations that is sufficient to stabilize the frequency-reuse pattern, or until no port requests a change in its assigned frequency for two consecutive cycles thereby indicating the convergence of the algorithm. This algorithm stabilizes rapidly, while adapting to changing operational conditions, such as the installation of new ports, which changes the system configuration, or the addition of new buildings which creates different interference patterns in the signal propagation paths.

17 Claims, 3 Drawing Sheets

METHOD AND APPARATUS FOR AUTONOMOUS ADAPTIVE FREQUENCY ASSIGNMENT IN TDMA PORTABLE RADIO SYSTEMS

BACKGROUND OF THE INVENTION

This invention relates to the assignment of frequencies in a frequency-reusing radio communications system such as a time division multiplexed/time division multiple access (TDM/TDMA) system used for low power portable digital telephony.

People by their very nature are highly mobile; no where is this more true than in modern day society with its myriad forms of travel. At the same time, many people increasingly have a need to be able to telephonically communicate with others particularly while they are on "the go", i.e. while they are moving.

However, this need for mobile communications, which existed for quite some time, has remained basically unsatisfied. Since telephones traditionally have cords, any movement of the telephone was traditionally limited by the length of its cord. For many years, only a veritable handful of telephones actually traveled with their users. These mobile telephones included aeronautical, marine and other forms of early radio telephones. Inasmuch as these mobile telephones were priced well beyond the affordability of the average telephone subscriber, none of these radio telephones ever encountered widespread use. Accordingly, for the vast majority of subscribers, a telephone set was installed at each subscriber location and there it remained unless it was reinstalled elsewhere. Thus, these subscribers either remained close to their telephone and thus restricted their mobility particularly in the anticipation of receiving a telephone call, or intentionally sought out a public or private telephone located along their route of travel whenever the need arose to place a telephone call.

Now with increasing sophistication of miniaturized electronic technology and decreasing attendant cost thereof, various vendors provide a number of devices (and/or services) that offer tetherless telephony. These devices, explained in more detail below, attempt to free a subscriber from being bound by the ambulatory constraints imposed by existing wireline telephone sets. In effect, each of these devices now permits subscribers effectively, at least to a certain extent, to take their telephone with them, obtain exchange access, and remain in communication wherever they go. These devices include cordless telephones, cellular mobile radio transceivers, public packet radio data network transceivers and radio pagers. As a growing number of consumers perceived the freedom of movement offered by these devices, a large demand was created for these devices. Moreover and not unexpectedly, as the prices of these devices continue to fall due to manufacturing economies and technical developments, the demand for these devices correspondingly continues to substantially increase. Specifically, approximately 25 million cordless telephone sets are in use today throughout the United States with demand for these sets continuing to rise as the price of cordless telephones with increasing sophisticated has remained within a $100.00 to $200.00 range. In addition, approximately three million cellular telephone sets are currently in use throughout the United States. As the price of various cellular sets falls from more than a $1000.00 which occurred merely a year ago to only a few hundred dollars today, the demand for these sets has increased precipitously. As a result, the number of installed sets has climbed at such an astonishing rate that in certain urban areas, such a New York , the number of sets in use at peak times is beginning to strain the capacity of the existing cellular network to handle the concomitant call traffic.

While, each of the present tetherless telephonic technologies possesses certain advantages, each technology also unfortunately has certain drawbacks that significantly restrict its use. In this regard, see, e.g., Cox, "Portable Digital Radio Communications—An Approach to Tetherless Access", IEEE Communications Magazine, Vol. 27. No. 7, July 1989 pages 30–40; and Cox, "Universal Digital Portable Radio Communications", Proceedings of the IEEE, Vol. 75, No. 4, April 1987, pages 436–476.

Specifically, as to cordless telephones, such a telephone consists of two transceivers: a base unit and a handset, that collectively form a low power duplex analog radio link. The base unit is connected, typically by a subscriber to a wireline access point in a conventional telephone network in lieu of or as a replacement for a wireline telephone, in order to implement a tetherless substitute for a telephone cord. Once connected, the base unit appears to the telephone network as a conventional telephone. The base unit contains a transmitter and a receiver, and simple control and interface apparatus for dialing, accepting ringing, terminating calls and coupling voice from the telephone line to the transmitter and from the receiver within the base unit to the telephone line. The handset, which is truly portable, contains simple control logic for initiating, receiving and terminating calls with the base unit and for turning its own transmitter on and off. To provide true duplex operation, separate carrier frequencies are used by the transmitters in the base unit and handset. Since cordless telephones operate with very low input power to their transmitter, usually on the order of only several milliwatts, the handset generally utilizes several small rechargeable batteries as its power source. This enables the handset to be made relatively small, lightweight and to be continuously used for a relatively long period, typically several hours, before its batteries require recharging. Furthermore, the very low level of power radiated from the handset poses essentially no biological radiation hazard to its user.

Unfortunately, the primary disadvantage of cordless telephones is their highly limited service area. Because cordless telephones use relatively low transmitter power, these telephones have a maximum range that varies from typically a few hundred to a thousand feet, which in turn results in a very small service area. A secondary disadvantage associated with cordless telephones stems from the limited number of available frequencies. At present, only a few separate frequencies, typically up to 10 duplex channels, have been allocated by the Federal Communications Commission (FCC) for use by cordless telephones. Moreover, early cordless telephones by their very design have been very susceptible to co-channel interference. This interference arises by the simultaneous operation of two or more cordless telephones situated in close proximity to each other, such as in an immediate neighborhood of a residential area. In a very small geographic area with a very low density of users, a reasonable probability exists that within this area one or more duplex pairs will not be in use at any one time, and, as such, this interference will not occur therein. Nevertheless, in an effort to avoid this interference, relatively sophisticated cordless telephones are now capable of operating on any one of a number of preprogrammed duplex pairs with either the user or the telephone itself selecting, manually in the case of the user and automatically by the telephone, the specific pair that is to be used at any one time. Unfortunately, if a sufficient number of cordless telephones are in use in a very densely populated area, such as an apartment building, pair selection may not be sufficient to eliminate the expected incidences of co-channel interference that results from undisciplined and uncoordinated duplex pair assignment and the resulting chaos experienced by users situated therein. In addition, since cordless telephones rely on analog modulation of a duplex pair, conversations occurring over a cordless telephone are highly vulnerable to eavesdropping. Furthermore, a cordless telephone only provides limited protection against unauthorized long distance or message units calls being made therethrough. While preprogrammed digital or tone access codes are being used between individual handset-base unit pairs and provide sufficient protection against casual attempts at unauthorized access, these codes are not sufficiently sophisticated to successfully deter a determined orderly assault on a cordless telephone by an unauthorized user. Furthermore, while cordless telephones provide limited portable radio access to a wireline access point, from a network standpoint cordless telephones do not eliminate the need for telephones lines, i.e. a customer drop, to be run to each subscriber.

Nonetheless, in spite of these severe service restrictions, cordless telephones are immensely popular for the freedom, though very limited, that they furnish to their users.

In contrast to the very limited range provided by cordless telephones, cellular mobile radio systems accommodate wide ranging vehicular subscribers that move at relatively high speeds. These systems utilize a relatively high power 850 MHz transmitter, typically operating at an input of approximately 0.5 watt to several tens of watts, in a mobile unit with a relatively high efficiency antenna to access a wireline telephone network through a fixed cell-site (base station). The base station also uses a high power transmitter in conjunction with a tall antenna, typically erected on a tower or tall building, to provide a relatively large coverage area. Due to the expense, typically ranging to $300,000 exclusive of land and building costs, and the antenna size associated with each base station, the least number of base stations are often used to cover a given area. Nonetheless, this arrangement generally provides a circular service area centered on a base station with a radius of approximately 5-10 miles therefrom. In use, a cellular radio system that covers a large region often encompassing a city, its suburbs and major access highways typically includes a number of geographically dispersed base stations. The base stations, containing radio receivers and transmitters and interface and control electronics, are connected by trunks to and coordinated and controlled by one or more Mobile Telephone Switching Offices (MTSOs) that, in turn, also provide access to the conventional wireline telephone network. All of the duplex radio channels available to the entire system are sub-divided into sets of channels. The radio equipment in each base station has the capability of using channels from one of the channel sets. These sets are allocated to the base station in a pattern that maximizes the distance between base stations that use the same sets so as to minimize average co-channel interference occurring throughout a service region. One or more channels are designated for initial coordination with the mobile sets during call setup.

Each mobile (or hand-held) cellular transceiver used in the system contains a receiver and a transmitter capable of operating on any duplex radio channel available to the cellular system. Calls can be made to or from any mobile set anywhere within the large region covered by a group of base stations. The control electronics in the mobile transceiver coordinates with a base station on a special call setup channel, identifies itself, and thereafter tunes to a channel designated by the base station for use during a particular call. Each duplex channel uses one frequency for transmission from base-to-mobile and a different frequency for transmission from mobile-to-base. The signal strength of calls in progress is monitored by the base stations that can serve those calls. Specifically, when the signal strength for a given call drops below a predetermined threshold, typically due to movement of the cellular subscriber from one cell to another, the MTSO connected to that base station coordinates additional signal strength measurements from other base stations which surround the station that is currently handling the call. The MTSO then attempts to switch ("handoff") the call to another duplex channel if one of the other base stations is receiving a stronger signal than that being received at the base station that is currently handling the call. This handoff of calls, totally transparent to the cellular subscriber, preserves the quality of the radio circuit as the subscriber moves throughout the service region. Moreover, calls are handed off from one MTSO to another, as the subscriber transits from one service area into another. Inasmuch as frequency usage is coordinated, relatively efficient use is made of the available frequency spectrum while minimizing the likelihood co-channel interference. In each different geographic service area within the United States, there are two competing cellular systems using different frequencies.

Though cellular mobile radio systems provide wide range, these systems suffer various drawbacks. First, cellular systems were originally designed for use in motor vehicles whose electrical systems could readily provide sufficient power. While portable hand-held cellular transceivers do exist, they must operate with sufficient transmitter input power, typically at least 0.5 watt, to reliably reach a base station. This, in turn, requires that a relatively large battery must be used within the portable cellular transceiver. However, due to the limits of present rechargeable battery technology, the amount of time that the portable transceiver can be used before it requires recharging is often quite limited. Furthermore, the cost of these rechargeable batteries and hence of the portable transceiver is rather high. Moreover, high radiated power levels, such as that which emanate from a mobile or portable cellular transceiver, may be sufficient to pose a potential biological radiation hazard to its user. Furthermore, since cellular systems were not designed to compensate for radio attenuation occurring within buildings, these systems are only able to provide little, if any, service within a building. Low power portable cellular transceivers are not operationally compatible with large cell sizes, designed to match the needs of fast moving vehicular users, and thus often provide poor communication in many areas within these calls. In addition, since cellular systems rely on merely frequency modulating a carrier with voice or data, these systems are also susceptible to eavesdropping. Lastly, from a network perspective, cellular systems are quite inefficient. Due to the inclusion of MTSOs with trunks connected to individual base stations, backhaul of cellular traffic over wired trunks often occurs over several miles prior to its entrance into the wireline network, thereby resulting in a wasteful overbuild of network transport facilities.

Public packet radio data networks presently exist to handle infrequent bursts of digital data between a fixed base station and a number of portable data transceivers. The fixed site has a transmitter that uses several tens of watts; while each portable data transceiver uses a transmitter that operates at a level of several watts. As such, reliable coverage is provided over a service area that may extend several miles in radius from a base station. Individual base stations are connected by a fixed distribution facility to a controller that can, in turn, be connected to either a local exchange network, to handle voice-band data, or a packet-data network which itself interconnects various computers. Multiple users contend for transmission time on typically a single radio channel. Data transmissions on the channel are set up in either direction through bursts of coordinating data, handshaking, that occur between a base station and a portable data transceiver. Appropriate controller and radio link protocols are used to avoid packet collisions. Once a data transfer is complete between that base station and a data transceiver, the channel is immediately available for reuse by others. Although data bursts are transmitted at relatively high power, each burst is transmitted for only a short duration. As such, the average power consumption for a portable data transceiver is far less than that associated with a portable cellular transceiver thereby allowing physically smaller internal batteries to be used with portable data transceivers than those used in portable cellular transceivers. Nevertheless, the high radiated power levels associated with a portable data transceiver again pose a potential biological radiation hazard to its user. In addition, these networks disadvantageously suffer from limited digital transmission capacity which restricts these networks to carrying short data bursts and not voice, and, like cellular systems, experience coverage restraints when used within buildings.

In contrast to the tetherless systems discussed above, radio paging systems provide simple unidirectional transmission from a fixed location to a specifically addressed portable pager, which when received provides an alerting tone and/or a simple text message. Paging systems provide optimized one-way communication over a large region through a high power transmitter, typically a few kilowatts, that uses high antennas at multiple sites to provide reliable coverage throughout the region. Satellite based paging systems are also in operation to provide extended service regions. Since a pager is merely a receiver with a small annunciator, its power requirement is very low. As such, a pager is quite small, light weight, reliable, relatively low cost, and can operate for long intervals before its batteries need to be recharged or replaced.

Due to the advantages in size, cost and operating duration offered by pocket pagers, attempts exist in the art, to impart limited two-way communication into paging systems which are themselves highly optimized for one-way traffic. One such attempt includes incorporation of an "answer back" message through "reverse" transmission links between the individual pagers and the fixed sites. While these attempts have met with great difficulty, these attempts nevertheless indicate that a substantial demand exists for an inexpensive two-way portable truly tetherless telephonic service that overcomes the range limitations associated with cordless telephones and the weight and cost limitations associated with portable cellular systems.

Furthermore, various intelligent network services are now being offered by the local telephone operating companies in an attempt to provide wireline subscribers with a certain degree of call mobility when they are away from their own wireline telephones. These services include call transfer and call forwarding. Both call transfer and call forwarding allow a subscriber to program a local switch, using any pushbutton telephone, to transfer all subsequently occurring incoming calls that would otherwise be routed to this subscriber's telephone to a telephone associated with a different wireline telephone number that the subscriber desires anywhere in the world either for a given period of time, as in call transfer, or until that subscriber appropriately reprograms the switch with a different forwarding number, as in call forwarding. In this manner, the subscriber can, to a certain extent, continually instruct the telephone network to follow his or her movements and thereby route his or her incoming calls to a different number in unison with that subscriber's actual route of travel. Unfortunately, with these services, the subscriber must manually interact with the network and continually enter a new forwarding telephone number(s) coincident with his or her continuing travel such that the network is always cognizant of the current telephone number to which his calls are to be forwarded.

Thus, a substantial overall need exists in the art for a truly portable personal communication technology that is designed for pedestrian use and which utilizes small, lightweight and relatively inexpensive portable transceivers while eliminating, or at least substantially reducing, the performance drawbacks associated with the use of currently existing tetherless telephonic technologies in portable communication applications.

In an attempt to provide this needed technology, the art has turned to low power portable digital telephony. In essence, this technology, similar to cellular radio, uses a fixed base unit (hereinafter referred to as a port) and a number of mobile transceivers (hereinafter referred to as portables) that can simultaneously access that port on a multiplexed basis. However, in contrast to cellular radio, portable digital telephony uses low power multiplexed radio links that operate on a time division multiplexed/time division multiple access (TDM/TDMA) basis to provide a number of separate fully duplex demand-assigned digital channels between a port and each of its associated portables. Specifically, each port would transmit time division multiplexed (TDM) bit streams on a predefined carrier frequency, with, in turn, each portable that accesses that port responding by transmitting a TDMA burst on a common though different predefined carrier frequency from that used by the port. Quadrature phase shift keying (QPSK), with an inter-carrier spacing of 150 to 300 KHz and within a given operating frequency band situated somewhere between approximately 0.5 to 5 GHz would be used by both the port and portables. The power used by the transmitter in the portable would range between 5-10 milliwatts or less on average and provide a range of several hundred to a thousand feet.

As such, the resulting low radiated power would pose essentially no biological radiation hazard to any user. In addition, the port antenna would be relatively small and suitable for mounting on a utility or light pole. With this transmission range, a port could simultaneously serve typically 20-30 separate locally situated portables. The same TDM channels would be reused at ports that are spaced sufficiently far apart to reduce co-channel interference to an acceptably low level but yet conserve valuable spectrum. To provide access to the wireline telephone network, each port would be interfaced, typically through a conventional fixed distribution facility, over either a copper or fiber connection to a switching machine at a local central office. The switching machine would be suitably programmed, in a similar manner as is an MTSO, to controllably and automatically handoff calls from one port to another as subscribers move their portables from port to port.

Due to the very limited transmitter power, each portable is anticipated to be very light-weight, physically small and provide a relatively long operating life between battery recharging or replacement. The cost to a subscriber for a portable is expected, through very large scale integrated (VLSI) circuit implementations, to reside in the range of $100.00 to $350.00. In addition, each port would require a relatively small electronic package and carry an overall expected cost of less than $25,000.00—which is far less, by at least an order of magnitude, than that of a current cellular base station. Moreover, the digital data carried on each channel could be readily encrypted to provide a desired degree of security and privacy against eavesdropping. Furthermore, with this technology, a port antenna, due to its small size, could be readily moved within a building to cope with signal attenuation occurring therein. Port spacings would be properly established within the building and frequency reuse would be properly controlled between these ports to provide portable service having an acceptably low level of co-channel interference to a high density of users situated therein.

From a network perspective, low power portable digital telephony is extremely attractive. At present, approximately $50-100 billion is invested by local operating telephone companies in costs associated with copper subscriber loops that run from distribution points to local telephone company demarcation points on individual customer drops. For a local telephone company, the per-subscriber cost of installing and maintaining a subscriber loop is generally greater at the loop end closest to a subscriber than at the far end thereof since the loop end is more dedicated to that subscriber than the far end is. Given the range provided by portable low power telephony, ports can be appropriately positioned throughout an area to provide radio link based exchange access and thereby substitute inexpensive mass produced VLSI circuitry for costly dedicated copper loops that would otherwise emanate from a distribution facility to an individual subscriber. Hence, by installing various ports throughout for example a building, significant labor intensive installation and maintenance tasks associated with rewiring of telephone drops and relocation of telephone equipment would be eliminated with substantial savings being advantageously realized in attendant subscriber costs as people are moved from office to office therein.

Now, with the attractiveness of low power portable digital telephony being readily apparent, its success, in great measure, hinges on achieving satisfactory performance through the use of TDMA. Various aspects of TDMA have been treated in prior art patents such as U.S. Pat. No. 4,849,991, entitled "Method and Circuitry for Determining Symbol Timing for Time Division Multiple Access Radio Systems," issued Jul. 18, 1989 to H. W. Arnold and N. R. Sollenberger, the latter a co-inventor herein; U.S. Pat. No. 4,937,841, entitled "Method and Circuitry for Carrier Recovery for Time Division Multiple Access Radio Systems," issued Jun. 16, 1990 to J. C. Chuang and N. R. Sollenberger, co-inventors herein; and U.S. Pat. No. 4,941,155, entitled "Method and Circuitry for Symbol Timing and Frequency Offset Estimation in Time Division Multiple Access Radio Systems," issued Jul. 10, 1990 also to the co-inventors herein. A technique for jointly performing burst synchronization and error detection in a TDM/TDMA system is also described in co-pending patent application Ser. No. 404,946 filed Sep. 9, 1989.

One aspect of TDM/TDMA system performance not treated in these patents is the assignment and coordination of radio frequencies at the ports. An efficient assignment method can improve frequency reuse while maintaining an acceptable level of combined co-channel and adjacent channel interference, which will lead to better spectrum utilization. Traditionally, in frequency-reusing systems a service area is divided into coverage areas which are assigned different sets of fixed frequencies to minimize mutual interference. The same set of frequencies are then reused beyond a minimum reuse distance. Such a fixed assignment method is inefficient from both signal quality and traffic considerations. Particularly, quality will not be acceptable if the reuse distance is too small, while a conservative choice of reuse distance results in poor frequency utilization. Additionally, under nonuniform traffic loads, calls may be blocked in the high-traffic area while some frequency channels remain under-utilized in other areas.

Many alternative assignment methods have been proposed to improve spectrum utilization. Most of these methods focus on improving the short-term traffic-handling capability and put very little emphasis on the signal quality and frequency reuse. Various dynamic channel allocation methods are described by D. Cox and D. Reudnink in "A Comparison of Some Channel Assignment Strategies in Large Scale Mobile Communications Systems," *IEEE Trans. Comm.*, pp. 190-195, April 1972; S. Elnoubi, R. Singh and S. Gupta in "A New Frequency Channel Assignment Algorithm in High Capacity Mobile Communication Systems," *IEEE Trans. Veh. Tech.*, pp. 125-131, August 1982; and M. Zhang and T. Yum in "Comparisons of Channel Assignment Strategies in Cellular Mobile Telephone Systems," *Proceedings, IEEE ICC '89*, pp. 467-471, June 1989. In many of these dynamic channel allocation methods the fading effects are ignored, and quality and frequency reuse are assumed to be solely distance dependent. This limits the usability of the algorithms in real applications. Furthermore, these methods usually assume central coordination among neighboring base stations requiring complex algorithms which are often impractical to implement. Since these methods cannot adapt to the variations in the propagation environment, spectrum efficiency is obtained at the expense of signal quality.

For Frequency Division Multiple Access (FDMA) channelization plans used by cellular mobile radio, the concept of channel assignment based on the monitoring of link quality has been introduced. (See, e.g., S. Onoe, "Channel Assignments in Mobile Radio Systems Using Channel Interleaving," *Proceedings, IEEE ICC'88*, pp. 781-787, June 1988; R. Nettleton and G. Schloemer, "A High Capacity Assignment Method for Cellular Mobile Telephone Systems," *Proceedings, IEEE VTC'89*, pp. 359-367, May 1989; S. Onoe and S. Yasuda, "Flexible Re-use for Dynamic Channel Assignment in Mobile Radio Systems," *Proceedings, IEEE ICC'89*, pp. 472-476, June 1989; G. Falciaseca, M. Frullone, G. Riva, M. Sentinelli and A. Serra, "Investigation on a Dynamic Channel Allocation for High Capacity Mobile Radio Systems, " *Proceedings, IEEE VTC'88*, pp. 176-181, June 1988; and U.S. Pat. No. 4,736,453 issued Apr. 5, 1988 to G. R. Schloemer.) Most of these prior art methods require a central processor performing complicated search algorithms to find the "optimal" assignment pattern from a "quality matrix" obtained from link monitoring. The resultant channel assignment is adaptive to the propagation conditions at the expense of even higher algorithm complexity. Furthermore, since these methods were usually applied to examples simulated with regular port layout, it is not clear whether the adaptive algorithms can be as effective when the port layout is irregular as is likely to be the case in a TDM/TDMA Personal Communication Network (PCN) environment. Under an irregular port layout, even the simplest fixed frequency assignment method requires non-trivial pre-engineering to avoid impairments due to combined co-channel and adjacent-channel interferences.

For advanced cordless telephony systems, frequency assignment and traffic-channel access is performed simultaneously in real-time (see A. Motley, "Advanced Cordless Telecommunications Service," *IEEE Journal on Selected Areas in Comm.*, pp. 774-782, June 1987). In addition to making the access process more complicated, these "dynamic" assignment methods determine channel frequency based on real-time measurements which can not achieve long-term frequency coordination among ports. Consequently, these dynamic assignment methods can often result in premature termination of cells due to insufficient protection against co-channel and adjacent-channel interference.

An object of the present invention is to assign the frequencies in a frequency-reusing radio communications system by means of a procedure that can be performed completely autonomously at each port, and which procedure results in a distribution of transmitting frequencies among all the ports in the system that is robust against short-term signal fluctuations.

An additional object of the present invention is to assign the frequencies in a frequency-reusing radio communications system by means of a procedure that is readily adaptive to unstable propagation conditions due to changes in the network layout, such as new additions of ports, and to changes to the topography of the service area from new structures or, for ports within a building, interior rearrangements.

SUMMARY OF THE INVENTION

In accordance with the present invention, each port in a frequency-channelized frequency-reusing radio system, including FDMA and TDM/TDMA systems, is assigned a frequency based on a simple autonomous procedure based on signal strength measurements at the ports. In particular, a port receiver scans all the candidate port transmitter frequencies and measures signal powers while turning off its own transmitter. The transmitter frequencies are generally in use at the other ports. The frequency channel with the lowest received power is temporarily assigned for downlink (port to portable users) transmission by that port. This procedure is then independently and asynchronously repeated by each port. These steps are then iterated to update all frequency assignments until no ports change frequencies for at least two consecutive iterations or until a predetermined number of iterations is reached.

DETAILED DESCRIPTION

Figure 1:
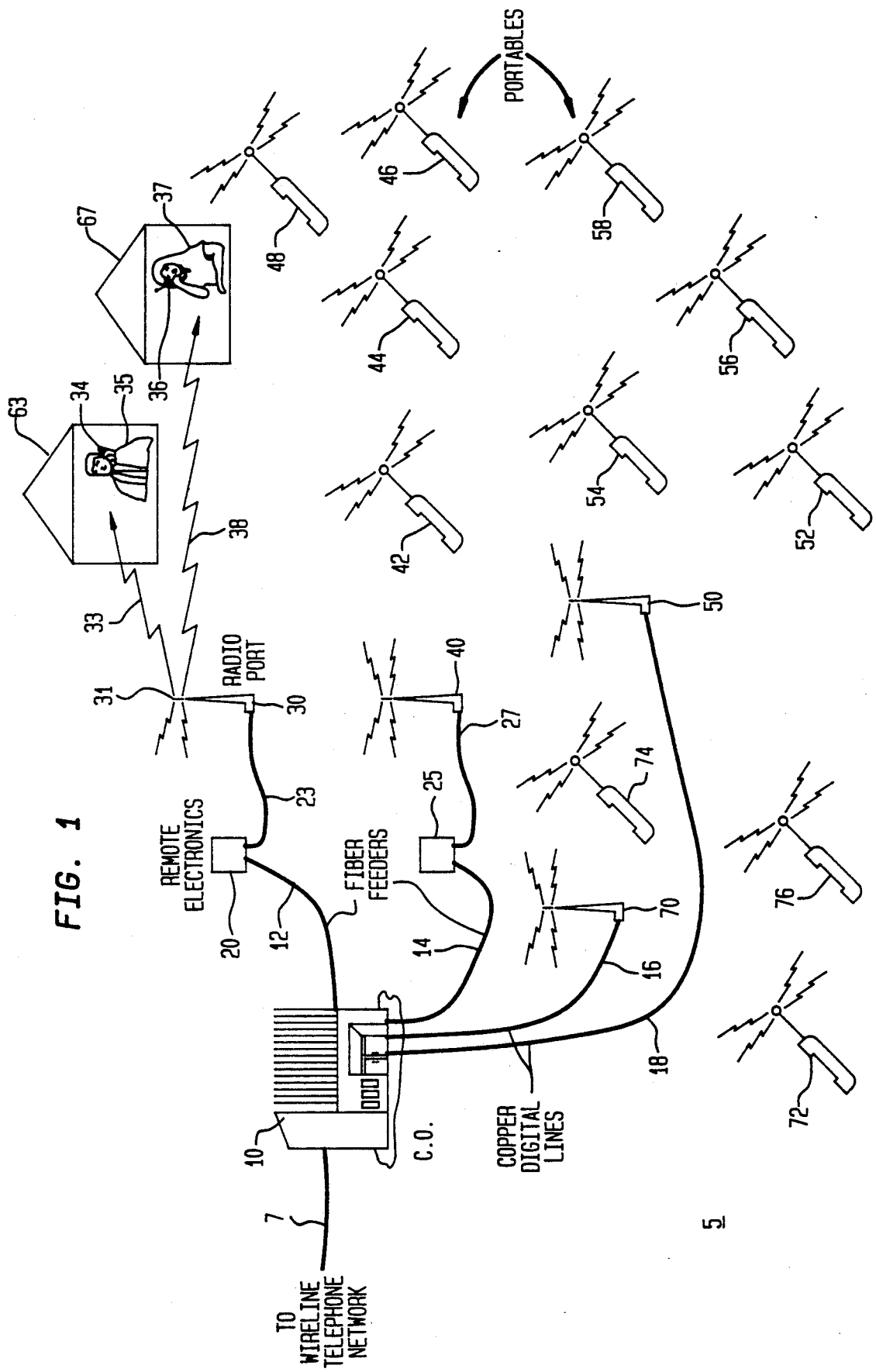
FIG. 1 shows a portable radio system using radio ports to provide tetherless communications.

An overall diagram of a low power portable TDM/TDMA digital telephony system 5 is shown in FIG. 1. Low power digital portable telephony utilizes a fixed base unit (referred to as a "port") and a number of mobile transceivers (each of which is referred to as a "portable"). Through use of time division multiple access (TDMA), each portable can access the port through a separate demand-assigned TDMA channel to carry duplex communication on a time division multiplexed (TDM) basis therebetween. The power used by the transmitter in each portable would range between 5-10 milliwatts or less on average and provide a range of several hundred to a thousand feet between a port and each of its portables. To accommodate a relatively large service area, several ports are used with individual calls being successively handed off from port to port as their corresponding callers carry their portables from the service area associated with one port to that of an adjacent port. An appropriate switch (not shown) which is located within a local central end office is suitably programmed to operate in a similar manner as does a mobile telephone switching office in order to controllably handoff calls from port to port as the callers transit corresponding local service areas associated therewith.

Specifically, system 5 contains four ports 30, 40, 50 and 70 and respective portables 34 and 36; 42, 44, 44, 46 and 48; 52, 54, 56 and 58; and 72, 74 and 76. The ports themselves are connected to the switch located within central office 10 to provide access to a wireline telephone network. This connection can typically occur in one of two ways: either through copper digital lines 16 and 18 for illustratively ports 70 and 50, respectively, or via intermediary copper digital lines 23 and 27 to remote electronics 20 and 25 for illustratively ports 30 and 40, respectively. The remote electronics contain fixed distribution and concentration facilities for multiplexing traffic, in addition to that provided by ports 30 and 40, onto fiber feeders 12 and 14 which, in turn, feed central office 10. The switch located within the central office is connected, through trunk 7, to the wireline telephone network.

Each port would transmit time division multiplexed (TDM) bit streams on a predefined carrier frequency using quadrature phase shift keying (QPSK) modulation, with an inter-carrier spacing of 150 to 300 KHz and within a given operating frequency band situated somewhere between approximately 0.5 to 5 GHz. With this transmission range, a port could simultaneously serve as many as typically 20 separate locally situated portables that each carries digitized speech at a bit rate of 16 kbits/second. Here, ports 30, 40, 50 and 70 respectively serve portables 34 and 36; 42, 44, 46 and 48; 52, 54, 56 and 58; and 72, 74 and 76. The same TDM channels would be reused at different ports that are spaced sufficiently far apart, such as ports 30 and 70, to reduce co-channel interference to an acceptably low level but yet conserve valuable spectrum. However, adjacent ports would be situated sufficiently close together in order to provide an appropriate degree of overlap of their respective service areas thereby ensuring no loss of coverage occurs during call handoff. Furthermore, each port utilizes a suitable antenna, such as antenna 31 for port 30, to carry its TDM transmissions to its associated portables and receive TDMA bursts therefrom. Given the carrier frequencies being used, each of these antennas is relatively small and suitable for mounting on a utility or light pole or within an office building.

Inasmuch as system 5 replaces local copper drops and telephone cords with short range low power radio links, ambulatory callers are provided with completely tetherless access. Accordingly, through radio links 33 and 38, illustrative callers 35 and 37 located within respective residences 63 and 67 are completely free to move within the entire service are provided by system 5, i.e. that provided by ports 30, 40, 50 and 70, while advantageously maintaining continuity of their existing telephone conversations as well as being able to place calls through other ("non-home") ports as their travel progresses.

Each port continuously transmits on a TDM basis, while portables transmit in bursts on a TDMA basis to their associated port. Two different carrier frequencies are used to carry communication between each port and a portable: one frequency, frequency f1 for port 30, to carry communication from that port to each of its portables (downlink transmission) and another frequency, frequency f2 for port 30, to carry communication from each of these portables to this port (uplink transmission). Although adjacent ports used different pairs of frequencies, one particular uplink frequency being associated with each downlink frequency, these carrier frequencies are also reused for ports that are spaced sufficiently far apart from each other to conserve spectrum. The spacing is adaptively set by the present invention to ensure that co-channel interference that might occur at any port will remain at an acceptably low level. By employing the procedure of the present invention described hereinbelow, the downlink frequencies of all ports (and thus that port's associated uplink frequency) are assigned so as to maintain this acceptable low level of co-channel interference.

The procedure of the present invention determines the long-term assignment of the port frequencies. On a call-by-call basis other procedures, not covered herein, are used at the portable for selecting the proper radio port (see e.g., R. C. Bernhardt, "User Access in Portable Radio Systems in a Co-Channel Interference Environment," *IEEE Journal of Selected Areas in Communications*, pp. 49-58, January 1989) and time slot (see e.g., R. C. Bernhardt, "Time-Slot Management in Frequency Reuse Digital Portable Radio Systems," *Proceedings, IEEE VTC'90*, May 1990). Port frequency-channel assignment is performed when the system is installed or when growth has occurred. It may also be performed on a regular basis to account for changing topological conditions. It is an off-line process that would be scheduled to minimize service disruption. Portable radio access, on the other hand, occurs in real-time and on demand from users. Time-slot assignment also occurs in real-time as part of the link access protocol.

Figure 2:
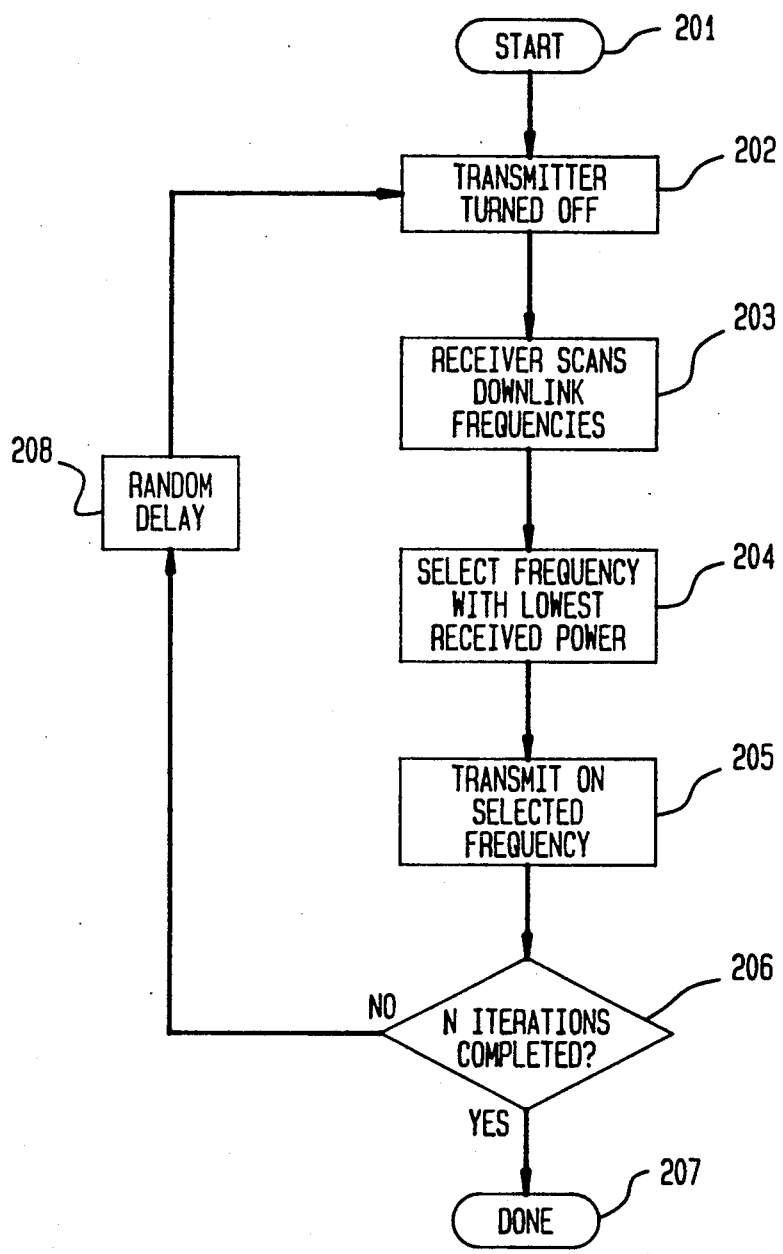
FIG. 2 is a flowchart of the frequency channel assignment procedure of the present invention that is performed by each port in the system of FIG. 1.
Figure 3:
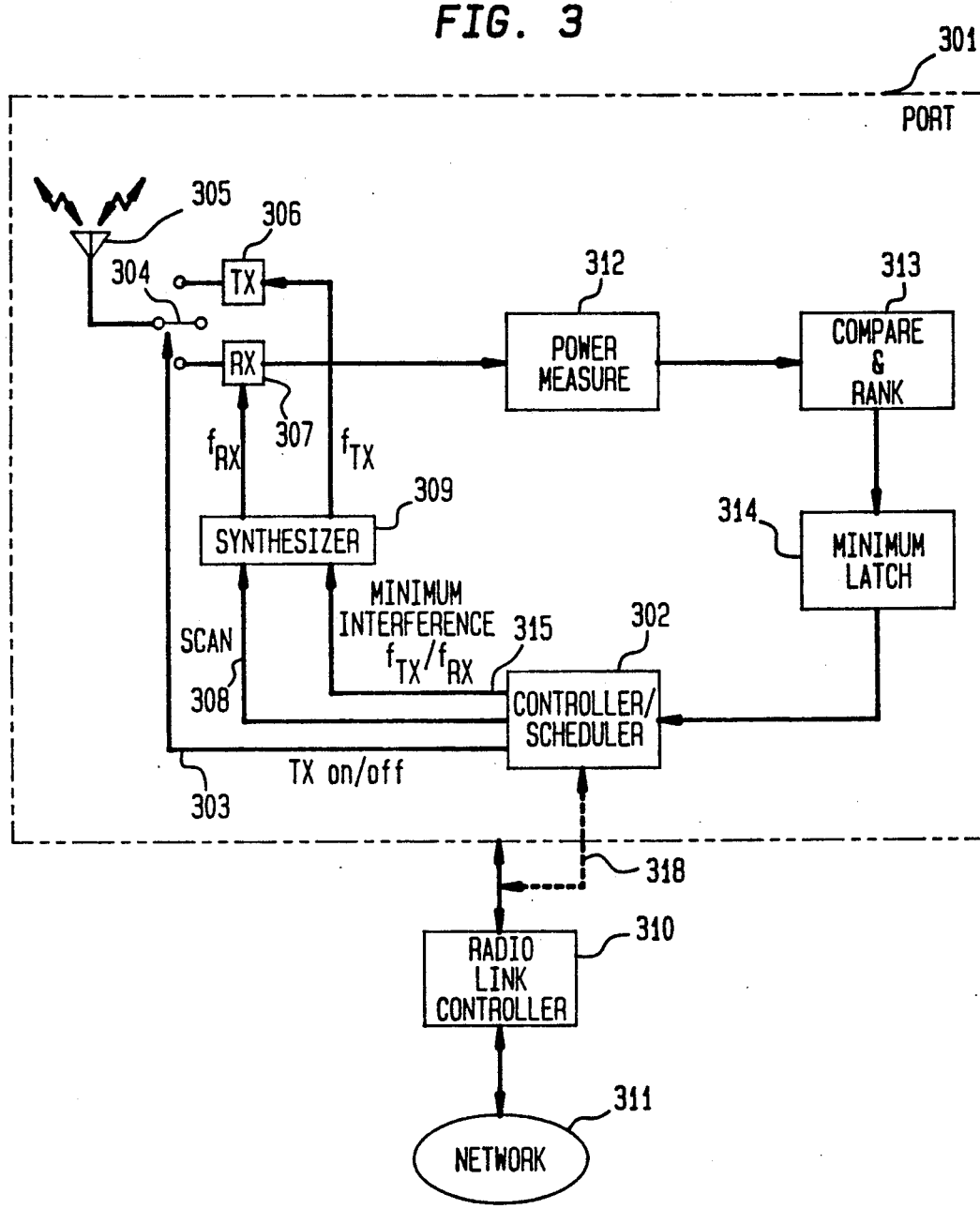
FIG. 3 is a block diagram of the equipment at each port required for performing frequency channel assignment.

In order to employ the frequency assignment procedure of the present invention, each port in the system (e.g., 30, 40, 50 and 70) includes the apparatus shown in FIG. 3. Before describing this apparatus, the procedure of the present invention will be described in detail. FIG. 2 shows a flowchart diagram of steps of the port frequency assignment procedure of the present invention. As previously noted, the procedure is initiated, at box 201, at a time when disruption to service is likely to be minimum, such as between the hours of 2:00 AM and 3:00 AM. At step 202, a port controller turns off its own transmitter to be able to "listen" to the downlink transmissions from all other ports. At step 203, the port receiver scans all candidate port transmitter frequencies and measures the powers received from all these other ports at all possible downlink frequencies. Thus for the system in FIG. 1, port 30 shuts its own transmitter off and scans the frequency spectrum to measure the power at the downlink frequencies of the other ports 40, 50 and 70. The signal power and the associated frequencies of each received signal are then ranked from low to high. At step 204, the frequency of port 30 is selected to be the frequency having the lowest received power. At step 205, port 30 commences to temporarily transmit on this selected downlink frequency. The uplink frequency associated with this downlink frequency is also set in the receiver circuitry of port 30.

Steps 202 through 205 are repeated at each port (40, 50 and 70 in the system by token passing or at random times during a preassigned time window. Each port in the system is thereby assigned a transmitting downlink and receiving uplink frequency. Once all the port frequencies are set, steps 201 through 205 are iterated at each port to update the just assigned port frequencies. This iterative process is repeated N times at each port (decision box 206), at which time downlink frequency assignment is complete (box 207). It has been found from computer simulations that N can be as low as 3. As an alternative to iterating the frequency updating steps N times, steps 202 through 205 can be repeated until the frequency assignment of each port in the system remains the same for two iterations. This would require, however, a controller in the central office (10 in FIG. 1) to communicate with each port.

Steps 201 through 207 can be performed with variations. For example, for system start-up, steps 202 through 205 can be executed beginning with only one port. A new port is then activated in each iteration until all ports are included. Alternatively, the frequency assignment steps can be performed after initializing all ports with arbitrary frequency assignments.

Advantageously, the frequency update cycle can be made completely autonomous without the use of a coordinated sequence or without the need for a central office controller. Simulations have indicated that there is no need to average out signal fluctuations due to fading when making the power measurements at each candidate frequency. The power measurements at each port can thus be made instantaneously and the frequency assignment procedure rapidly completed. The probability of more than one port performing frequency assignments simultaneously can therefore be made negligibly small if the iteration of steps 202 through 205 is delayed by a randomly determined time. Thus in the flowchart of FIG. 2 a random delay 208 is imposed between decision box 206 and the reiteration of steps 202 through 205. With this arrangement no complicated central control and planning is required to assign port frequencies. Furthermore, in an environment in which multiple service providers are providing digital portable radio communications service, a frequency assignment pattern can be configured without the need to coordinate the frequency assignment procedure with the other providers and still achieve a distribution of port frequencies that minimizes interference.

Although the system of FIG. 1 is very simple with only four ports 30, 40, 50 and 70, requiring frequency assignment, an actual system is likely to include one-hundred or more associated ports, thus necessitating significant frequency reuse over the system's service area. Advantageously, the method of the present invention combines the stable signal quality accomplished by fixed frequency assignment employed in many cellular mobile radio systems, and the adaptability and dynamic traffic handling capability accomplished by dynamic channel allocation employed by some cordless telephony systems.

FIG. 3 shows the additional port apparatus required to perform the above-described frequency assignment procedure. The port 301 includes a controller/scheduler 302. For completely autonomous frequency assignment controller/scheduler 302 will automatically initiate the frequency assignment procedure with randomly spaced iterations to avoid "collisions" with the other ports' frequency assignment procedures. For coordinated scheduling, a radio link controller 310, which can be located in the central office (10 in FIG. 1) in the radio network interface circuitry between the various feeders (12, 14, 16 and 18 in FIG. 1) and the wireline telephone network (311 in FIG. 3), can provide a command signal via lead 318 for controller/scheduler 302 to initiate the frequency assignment procedure. Frequency assignment, either self-initiated by controller/scheduler 302 or initiated by radio link controller 310, commences with a signal developed on lead 303 which controls a switch 304 connecting antenna 305 and the radio transmitting (TX) and receiving (RX) circuitry 306 and 307, respectively. In response to this signal on lead 303, outgoing transmission from transmitter 306 is interrupted and receiver 307 is set to receive incoming transmissions from the other ports in the system. In response to a scan signal developed by controller/scheduler on lead 308, synthesizer 309 commences to scan the signal received by receiver 307 at each possible downlink frequency. The received power at each of these downlink frequencies is measured by a power measure circuit 312. Compare and rank circuit 313 rank orders the received powers and records their associated frequencies and a minimum latch 314 transfers the frequency associated with the minimum received power to controller/scheduler 302. Synthesizer 309 sets transmitter 306 and receiver 307 with the resultant transmit and receive frequency pair, $f_{TX}$ and $f_{RX}$, respectively, that gives minimum interference, by means of a signal output from controller/scheduler 302 on lead 315. After either a random time interval determined by controller/scheduler 302, or in response to a signal from radio link controller 310, the process is iterated. For completely autonomous frequency assignment, each port iterates the process a fixed number of times. For controlled frequency assignment, each port iterates the process either a fixed number of times or until no port in the system changes frequency for at least tow consecutive iterations. In this latter case, the central radio link controller 310 is required to record the frequency assignment pattern of consecutive iterations of the assignment procedure to determine whether any reassignments have been made.

Although described in connection with a TDM/TDMA portable radio communications system, the frequency assignment method of the present invention could be applied to any frequency-reusing system, such as a frequency-division multiple access (FDMA) system, which is employed for cellular mobile radio telephony. In such systems more that one frequency is chosen for each base station. When applied to an FDMA radio system, the convergence time will be greater than that for a TDM/TDMA system because the base station receiver needs to scan many more frequency channels which are usually turned off during idle periods.

The above-described embodiment is illustrative of the principles of the present invention. Other embodiments may be devised by those skilled in the art without departing from the spirit and scope of the present invention.

What is claimed is:

1. A method of assigning radio frequencies in a frequency-reusing radio communications system having a plurality of fixed base units and a plurality of mobile transceivers, each fixed base unit having a transmitter for transmitting at an assigned downlink frequency to at least one mobile transceiver, a receiver for receiving at an associated uplink frequency from said at least one mobile transceiver and for receiving at all the downlink frequencies being transmitted by the other of the plurality of fixed base units in the system, and means for measuring the power level of signals received at all the possible different downlink frequencies from the other of the plurality of fixed base units in the system, comprising the steps of:
   (a) turning off the transmitter at a first base unit;
   (b) tuning the receiver at that first base unit to each possible downlink frequency;
   (c) measuring at that first base unit the power level of the downlink signals received at each of the possible downlink frequencies from the other of the plurality of fixed base units in the system;
   (d) determining at that first base unit the downlink frequency associated with the lowest measured power level;
   (e) assigning and setting the downlink frequency at that first base unit to the downlink frequency determined in step (d);
   (f) turning on the transmitter at that first base unit with its transmitting downlink frequency being set at the frequency set in step (e);
   (g) repeating steps (a) through (f) at each of the other of the plurality of base units in the system; and
   (h) after each of the plurality of base units in the system has its downlink frequency set in accordance with steps (a) through (f), repeating steps (a) through (g) to update the assignment of downlink frequencies to each of the base units.

2. A method in accordance with claim 1 wherein in step (h) each base unit independently waits a random time before repeating steps (a) through (f).

3. A method in accordance with claim 1 wherein step (h) repeats steps (a) through (f) at each base unit a predetermined number of times.

4. A method in accordance with claim 1 wherein a signal generated by a central controller initiates the start of steps (a) through (f) at each base unit.

5. A method in accordance with claim 1 wherein step (h) repeats steps (a) through (g) until no base unit sets its downlink frequency to a new downlink frequency in two consecutive repeats of steps (a) through (g).

6. A method of assigning radio frequencies in a TDM/TDMA digital telephony system having a plurality of fixed ports and a plurality of mobile portable units, each port having a transmitter for transmitting at an assigned downlink frequency to at least one portable unit, a receiver for receiving at an associated uplink frequency from said at least one portable unit and for receiving at all the downlink frequencies being transmitted at by the other of the plurality of ports in the system, and means for measuring the power level of signals received at all the possible different downlink frequencies from the other of the plurality of ports in the system, comprising the steps of:

(a) turning off the transmitter at a first port;

(b) tuning the receiver at that first port to each possible downlink frequency;

(c) measuring at that first port the power level of the downlink signals received at each of the possible downlink frequencies from the other of the plurality of ports in the system;

(d) determining at that first port the downlink frequency associated with the lowest measured power level;

(e) assigning and setting the downlink frequency at that first port to the downlink frequency determined in step (d);

(f) turning on the transmitter at that first port with its transmitting downlink frequency being set at the frequency set in step (e);

(g) repeating steps (a) through (f) at each of the other of the plurality of ports in the system; and (h) after each of the plurality of ports in the system has its downlink frequency set in accordance with steps (a) through (f), repeating steps (a) through (g) to update the assignment of downlink frequencies to each of the ports.

7. A method in accordance with claim 6 wherein in step (h) each port independently waits a random time before repeating steps (a) through (f).

8. A method in accordance with claim 6 wherein step (h) repeats steps (a) through (f) at each port a predetermined number of times.

9. A method in accordance with claim 6 wherein a signal generated by a central controller initiates the start of steps (a) through (f) at each port.

10. A method in accordance with claim 6 wherein step (h) repeats steps (a) through (g) until no port sets its downlink frequency to a new downlink frequency in two consecutive repeats of steps (a) through (g).

11. In a frequency-reusing radio communications system having a plurality of fixed ports and a plurality of mobile portable units, each one of the plurality of the ports having a transmitter for transmitting to at least one portable unit at an assigned downlink frequency and a receiver for receiving from said at least one portable unit at an associated uplink frequency and for receiving at all the downlink frequencies being transmitted by the other of the plurality of ports in the system, each one of the plurality of ports further comprising means for setting the downlink and associated uplink frequencies comprising:

means for turning the transmitter off for setting the downlink and uplink frequencies and for turning the transmitter on for transmitting to at least one portable unit at the set downlink frequency;

means for measuring the power level of the downlink signals received at each of the possible downlink frequencies from the other of the plurality of ports in the system when said transmitter is off;

means for determining the downlink frequency associated with the lowest measured power level; and means for setting as the downlink frequency of the transmitter to the downlink frequency determined to be associated with the lowest measured power level and for setting as the uplink frequency of the receiver to the frequency associated with that set downlink frequency.

12. A port in accordance with claim 11 further comprising control means for controlling when the downlink and uplink frequencies are set.

13. A port in accordance with claim 12 wherein said control means sets and resets the downlink and uplink frequencies at randomly spaced times.

14. A system in accordance with claim 13 wherein said control means iteratively sets the downlink and uplink frequencies a predetermined number of times.

15. A system in accordance with claim 11 wherein each of the plurality of ports is connected to a centralized control means, said centralized control means for controlling when each of the plurality of ports sets its downlink and uplink frequencies.

16. A system in accordance with claim 15 wherein said centralized control means sequentially initiates the setting of the downlink and uplink frequencies at each of the plurality of ports.

17. A system in accordance with claim 16 wherein said centralized control means iteratively sets the downlink and uplink frequencies of each of the plurality of ports until no port changes its frequency assignment in two consecutive iterations.

* * * * *